(12) United States Patent
Nemoto et al.

(10) Patent No.: US 11,472,959 B2
(45) Date of Patent: Oct. 18, 2022

(54) ALIPHATIC POLYESTER RESIN COMPOSITION, METHOD FOR PRODUCING THE SAME, AND PRODUCED PRODUCT

(71) Applicant: RICOH COMPANY, LTD., Tokyo (JP)

(72) Inventors: Taichi Nemoto, Shizuoka (JP); Chiyoshi Nozaki, Tokyo (JP); Hideki Sugiura, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 43 days.

(21) Appl. No.: 16/851,160

(22) Filed: Apr. 17, 2020

(65) Prior Publication Data

US 2020/0339806 A1    Oct. 29, 2020

(30) Foreign Application Priority Data

Apr. 26, 2019 (JP) ............................. JP2019-085656

(51) Int. Cl.
*C08L 67/04*   (2006.01)
*C08K 3/26*    (2006.01)
*C08J 5/18*    (2006.01)

(52) U.S. Cl.
CPC ............... *C08L 67/04* (2013.01); *C08J 5/18* (2013.01); *C08K 3/26* (2013.01); *C08K 2003/265* (2013.01); *C08K 2201/003* (2013.01); *C08L 2201/06* (2013.01); *C08L 2203/12* (2013.01); *C08L 2203/16* (2013.01); *C08L 2203/30* (2013.01)

(58) Field of Classification Search
CPC combination set(s) only.
See application file for complete search history.

(56) References Cited

U.S. PATENT DOCUMENTS

| 8,604,123 B1 * | 12/2013 | Weismann | C08K 3/26 |
| | | | 524/539 |
| 9,029,481 B2 | 5/2015 | Nemoto et al. | |
| 9,127,118 B2 | 9/2015 | Santo et al. | |
| 9,346,915 B2 | 5/2016 | Nemoto et al. | |
| 9,469,723 B2 | 10/2016 | Osaka et al. | |
| 9,587,072 B2 | 3/2017 | Nemoto et al. | |
| 9,688,815 B2 | 6/2017 | Nozaki | |
| 2011/0172326 A1 * | 7/2011 | Weismann | C08L 3/02 |
| | | | 523/128 |
| 2011/0218301 A1 | 9/2011 | Nemoto et al. | |
| 2011/0218313 A1 | 9/2011 | Mase et al. | |
| 2012/0065357 A1 | 3/2012 | Yamauchi et al. | |
| 2012/0295188 A1 | 11/2012 | Nakajima et al. | |
| 2013/0202996 A1 | 8/2013 | Yamauchi et al. | |
| 2014/0163194 A1 | 6/2014 | Nemoto et al. | |
| 2014/0187665 A1 * | 7/2014 | Flaherty | C08K 9/02 |
| | | | 523/100 |
| 2014/0200326 A1 | 7/2014 | Yamauchi et al. | |
| 2014/0213754 A1 | 7/2014 | Nemoto et al. | |
| 2014/0342286 A1 | 11/2014 | Yamauchi et al. | |
| 2014/0350209 A1 | 11/2014 | Nemoto et al. | |
| 2014/0371420 A1 | 12/2014 | Mase et al. | |
| 2015/0011724 A1 | 1/2015 | Nemoto et al. | |
| 2015/0031827 A1 | 1/2015 | Nozaki et al. | |
| 2015/0141611 A1 | 5/2015 | Satoh et al. | |
| 2015/0225512 A1 | 8/2015 | Nemoto et al. | |
| 2015/0322201 A1 | 11/2015 | Arai et al. | |
| 2015/0329668 A1 | 11/2015 | Miyahara et al. | |
| 2015/0353677 A1 | 12/2015 | Izumi et al. | |
| 2015/0361213 A1 | 12/2015 | Kamada et al. | |
| 2015/0361214 A1 | 12/2015 | Nemoto et al. | |
| 2016/0017113 A1 * | 1/2016 | Muller | B29B 9/06 |
| | | | 524/425 |
| 2016/0083512 A1 | 3/2016 | Kamada et al. | |
| 2016/0280849 A1 | 9/2016 | Kamada et al. | |
| 2016/0297927 A1 | 10/2016 | Izumi et al. | |
| 2017/0198137 A1 | 7/2017 | Blanchard et al. | |
| 2019/0040217 A1 * | 2/2019 | James | C08J 7/06 |
| 2019/0256688 A1 * | 8/2019 | Rentsch | C08K 3/26 |
| 2021/0163715 A1 * | 6/2021 | Nemoto | C08K 3/346 |

FOREIGN PATENT DOCUMENTS

| JP | 2013-057072 | 3/2013 |
| JP | 6174453 | 7/2017 |
| JP | 6401303 | 9/2018 |

OTHER PUBLICATIONS

Chen et al. (Polymer Testing 42, 2015, 160-167) (Year: 2015).*

* cited by examiner

*Primary Examiner* — Liam J Heincer
(74) *Attorney, Agent, or Firm* — Grüneberg and Myers PLLC

(57) ABSTRACT

An aliphatic polyester resin composition including: an aliphatic polyester resin; and calcium carbonate, wherein an amount of the calcium carbonate in the aliphatic polyester resin composition is 20% by mass or more, a number average particle diameter of the calcium carbonate in the aliphatic polyester resin composition is 0.20 μm or more but less than 0.40 μm, and a standard deviation of the number average particle diameter is 0.3 or more but 0.6 or less.

19 Claims, 3 Drawing Sheets

ALIPHATIC POLYESTER RESIN COMPOSITION, METHOD FOR PRODUCING THE SAME, AND PRODUCED PRODUCT

CROSS-REFERENCE TO RELATED APPLICATIONS

The present application claims priority under 35 U.S.C. § 119 to Japanese Patent Application No. 2019-085656, filed Apr. 26, 2019. The contents of which are incorporated herein by reference in their entirety.

BACKGROUND OF THE INVENTION

Field of the Invention

The present disclosure relates to an aliphatic polyester resin composition, a method for producing the aliphatic polyester resin composition, and a produced product.

Description of the Related Art

In recent years, because aliphatic polyester resins such as polylactic acid and polybutylene succinate have biodegradablility, materials in connection with recent garbage problems have been actively developed, and replacement of non-biodegradable polymers with the aliphatic polyester resins has widely been considered.

Meanwhile, calcium carbonate is used in various fields such as food, paper, and cosmetics because calcium carbonate is an inexpensive pigment having high brightness. Examples of the calcium carbonate include heavy calcium carbonate and precipitated calcium carbonate. Considering that precipitated calcium carbonate and a polymer are kneaded, the precipitated calcium carbonate has a problem that an amount of water in the precipitated calcium carbonate is high due to high hydrophilicity of calcium carbonate. Particularly, it is difficult to stably introduce the precipitated calcium carbonate into an aliphatic polyester resin that easily undergoes hydrolysis.

A particle diameter of the heavy calcium carbonate varies widely. Therefore, when these heavy calcium carbonates are ununiformly introduced into a resin to thereby obtain a sheet, physical properties of the sheet such as brightness, strength, and flexibility cannot be satisfied or a cause of nonuniformity may be caused.

Therefore, in order to introduce heavy calcium carbonate at a high concentration into an aliphatic polyester resin, it is necessary to uniformly disperse it in the aliphatic polyester resin, which is not sufficient because of the following reasons.

(1) The heavy calcium carbonate is alkaline, and a problem such as cleavage of molecular chains may be possibly caused when the heavy calcium carbonate is kneaded with an aliphatic polyester resin. Therefore, shearing energy cannot be applied so much. In order to overcome the aforementioned problem, it is proposed that resins other than the aliphatic polyester resin are blended to adjust the melt viscosity (see, for example, Japanese Patent No. 6401303). However, most of them (e.g., polyolefin such as polyethylene or polypropylene, polystyrene, and polymethyl methacrylate) are copolymerized or blended with such a component that degrades biodegradablility the aliphatic polyester resin has.

(2) The aliphatic polyester resin drastically decreases the viscosity at a temperature that is equal to or higher than the melting point, and is generally considered as a resin that is not suitable for dispersing fillers such as calcium carbonate. Actually, there is description that in the cases where an attempt to disperse calcium carbonate in polylactic acid is performed, when the calcium carbonate has a 50% volume particle diameter $D_{50}$ of less than 0.4 µm, particles of the calcium carbonate cohere, which is not preferable (see, for example, Japanese Patent No. 6174453).

SUMMARY OF THE INVENTION

According to one aspect of the present disclosure, an aliphatic polyester resin composition includes: an aliphatic polyester resin; and calcium carbonate. An amount of the calcium carbonate in the aliphatic polyester resin composition is 20% by mass or more. A number average particle diameter of the calcium carbonate in the aliphatic polyester resin composition is 0.20 µm or more but less than 0.40 µm. A standard deviation of the number average particle diameter is 0.3 or more but 0.6 or less.

Figure 1:
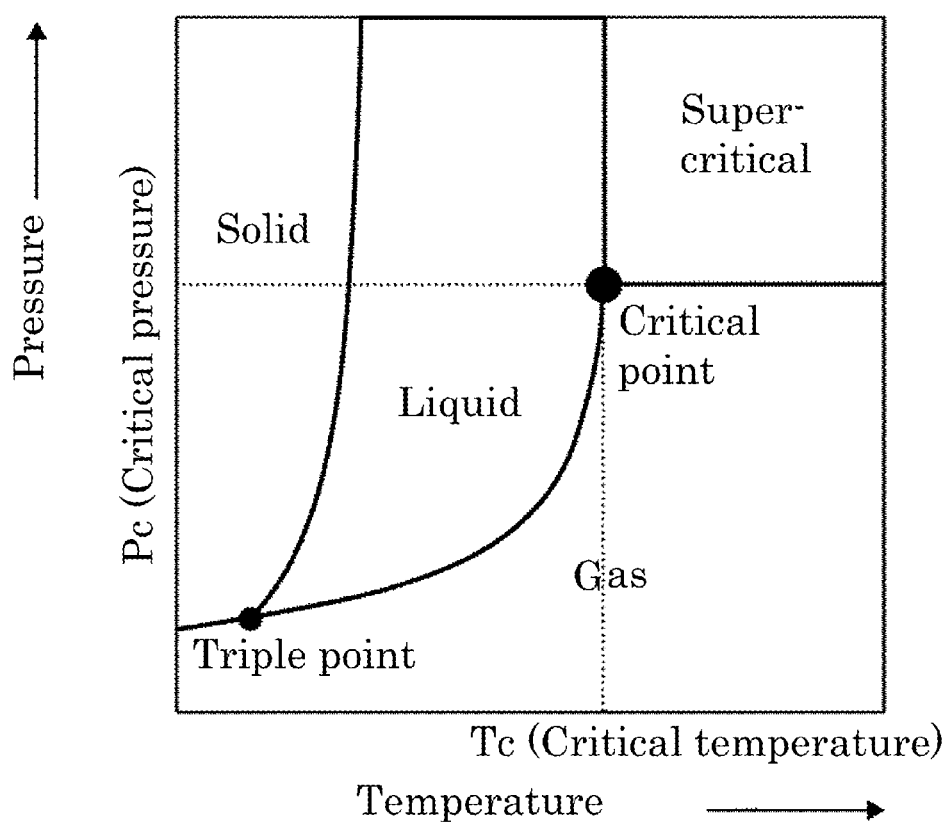
FIG. 1 is a phase diagram depicting the state of a substance depending on pressure and temperature conditions.

DETAILED DESCRIPTION OF THE INVENTION (Aliphatic Polyester Resin Composition)

An aliphatic polyester resin composition of the present disclosure includes: an aliphatic polyester resin; and calcium carbonate. An amount of the calcium carbonate in the aliphatic polyester resin composition is 20% by mass or more. A number average particle diameter of the calcium carbonate in the aliphatic polyester resin composition is 0.20 µm or more but less than 0.40 µm. A standard deviation of the number average particle diameter is 0.3 or more but 0.6 or less.

An object of the present disclosure is to provide an aliphatic polyester resin composition that has high brightness and is excellent in biodegradablility.

According to the present disclosure, it is possible to provide an aliphatic polyester resin composition that has high brightness and is excellent in biodegradablility.

The aliphatic polyester resin composition of the present disclosure includes an aliphatic polyester resin and calcium carbonate, and further includes other components if necessary.

<Aliphatic Polyester Resin>

Because the aliphatic polyester resin is allowed to biodegrade by microorganisms (biodegradable resin), it has attracted attention as an environmentally friendly high polymer material with a low environmental load (see, "The structure, physical property, and biodegradablility of aliphatic polyester", KOBUNSHI, 2001, vol. 50, No. 6. pp. 374 to 377).

Examples of the aliphatic polyester resin include polylactic acid, polyglycolic acid, poly(3-hydroxybutyrate), poly (3-hydroxybutyrate-3-hydroxyhexanoate), poly(3-hydroxybutyrate-3-hydroxyvalerate), polycaprolactone, polybutylene succinate, and poly(butylene succinate-adipate). These may be used alone or in combination. Among them, polylactic acid is preferable because it is a carbon neutral material and is relatively inexpensive.

In terms of biodegradability, a rate of the aliphatic polyester resin is preferably 60% by mass or more, more preferably 99% by mass or more relative to the total amount of organic matters in the aliphatic polyester resin composition.

<Method for Measuring Rate of Aliphatic Polyester Resin>

The rate of the aliphatic polyester resin can be calculated from a rate of a material to be charged. If the rate of the material is unclear, for example, the following GCMS analysis is performed, and the component can be specified through comparison using a known aliphatic polyester resin as a standard sample. If necessary, the calculation can be performed in combination with an area ratio of spectra measured through NMR or another analysis method.

Measurement Through GCMS Analysis

GCMS: QP2010, available from SHIMADZU CORPORATION; auxiliary device: Py3030D, available from Frontier Laboratories Ltd.
Separation column: Ultra ALLOY UA5-30M-0.25F, available from Frontier Laboratories Ltd.
Sample heating temperature: 300° C.
Column oven temperature: 50° C. (maintained for 1 minute) to temperature rising: 15° C./min to 320° C. (6 minutes)
Ionization method: Electron Ionization (E. I) method
Detection mass range: from 25 to 700 (m/z)

<Calcium Carbonate>

As an inexpensive pigment having high brightness, calcium carbonate is used in various fields such as food, paper, and cosmetics. Examples of the calcium carbonate include heavy calcium carbonate and precipitated calcium carbonate.

The precipitated calcium carbonate is chemically synthesized through the carbon dioxide reaction method or the soluble salt reaction method, and has advantages that particles thereof have a fine and nano-level size and have a uniform shape, and the precipitated calcium carbonate includes less impurity and has high brightness. However, considering that precipitated calcium carbonate and a polymer are kneaded, the precipitated calcium carbonate has a problem that an amount of water in the precipitated calcium carbonate is high due to high hydrophilicity of calcium carbonate. Particularly, it is difficult to stably introduce the precipitated calcium carbonate into an aliphatic polyester resin that easily undergoes hydrolysis.

Meanwhile, a commercially available product obtained by pulverizing limestone is called heavy calcium carbonate. The heavy calcium carbonate is a mineral that can be domestically produced, and is preferable because of high affinity for nature.

However, a particle diameter of the heavy calcium carbonate varies widely. Therefore, when such heavy calcium carbonate is ununiformly introduced into a resin to thereby obtain a sheet, physical properties of the sheet such as brightness, strength, and flexibility of the sheet cannot be satisfied or a cause of nonuniformity may be caused.

Therefore, it is necessary to uniformly disperse heavy calcium carbonate in an aliphatic polyester resin composition in order to introduce the heavy calcium carbonate at a high concentration into the aliphatic polyester resin composition.

An amount of the calcium carbonate is 20% by mass or more, preferably 20% by mass or more but 60% by mass or less relative to the total amount of the aliphatic polyester resin composition.

When the amount of the calcium carbonate is 20% by mass or more, high brightness can be obtained. Considering molding processability of the aliphatic polyester resin composition, the amount of the calcium carbonate is preferably 60% by mass or less. According to the present disclosure, even when the amount of the calcium carbonate is small, the calcium carbonate is excellent in brightness and an opacifying effect because dispersibility of calcium carbonate is improved.

As the calcium carbonate, heavy calcium carbonate is preferably used. In the case of precipitated calcium carbonate, a number average particle diameter thereof is often less than 1 µm. Such precipitated calcium carbonate has a large specific surface area and therefore a high water content. Therefore, in the case where the precipitated calcium carbonate is introduced at a high concentration into an aliphatic polyester resin composition, when drying is insufficiently performed, failure in molding may be caused or decomposition of the aliphatic polyester resin may occur.

A number average particle diameter of the calcium carbonate is preferably 1 µm or more but 10 µm or less, more preferably 1 µm or more but 5 µm or less. The number average particle diameter is preferably 1 µm or more in terms of the water content. However, considering harmful effects (e.g., coloring and cleavage of molecular chains of the aliphatic polyester resin) due to an increase of kneading energy, the upper limit thereof is preferably 10 µm or less for use. Note that, presence or absence of a surface treatment of the calcium carbonate is not particularly limited.

<Calcium Carbonate in Aliphatic Polyester Resin Composition>

Calcium carbonate in an aliphatic polyester resin composition presents the same meaning as calcium carbonate in a produced product including the aliphatic polyester resin composition.

A number average particle diameter (Feret diameter) of the calcium carbonate in the aliphatic polyester resin composition is 0.20 µm or more but less than 0.40 µm.

The number average particle diameter of less than 0.4 µm makes physical properties such as strength, flexibility, and brightness good even when calcium carbonate is introduced at a high concentration into the aliphatic polyester resin composition. When the number average particle diameter is 0.2 µm or more, the kneading energy becomes appropriate. When the number average particle diameter thereof is less than 0.2 µm, harmful effects (e.g., coloring and cleavage of molecular chains of the aliphatic polyester resin) occur due to an increase of kneading energy, which is not realistic.

A standard deviation of the number average particle diameter of the calcium carbonate in the aliphatic polyester resin composition is 0.3 or more but 0.6 or less, preferably 0.3 or more but 0.45 or less. The standard deviation of the number average particle diameter of 0.6 or less makes physical properties such as strength, flexibility, and brightness good even when calcium carbonate is introduced at a high concentration into the resin composition. When the standard deviation of the number average particle diameter is 0.3 or more, the kneading energy becomes appropriate.

<Measurement of Number Average Particle Diameter of Calcium Carbonate and Standard Deviation>

A cross section of a sheet formed of the aliphatic polyester resin composition is processed using an ion milling apparatus, and the cross section is observed through SEM.

The white component corresponding to calcium carbonate and the resin component in the photograph of the obtained cross section taken through SEM (magnification: 3000 folds) are binarized using a software (Image-Pro Premier, available from Mediacy). Then, a particle diameter (Feret diameter) is determined within the range of 35 μm×20 μm, and a number average particle diameter of the white component (calcium carbonate) having a Feret diameter of 0.05 μm or more, and its standard deviation (σ) are calculated.

A rate of the number of coarse particles of the calcium carbonate having a particle diameter of 10 μm or more is preferably 100 or less by number, more preferably 40 or less by number relative to 1 g of the aliphatic polyester resin composition. When the rate of the number of coarse particles of the calcium carbonate having a particle diameter of 10 μm or more is 100 or less by number relative to 1 g of the aliphatic polyester resin composition after kneading, physical properties such as appearance and strength are good.

<Measurement of Number of Coarse Particles of Calcium Carbonate>

Regarding the number of coarse particles (number/g) of calcium carbonate having a particle diameter of 10 μm or more, the aliphatic polyester resin composition (50 mg) is melted again to form a thin film having a thickness of 10 μm. Then, an optical microscope (available from Nikon, FX-21, magnification: 100 folds) is used to count the number of calcium carbonate having a particle diameter of 10 μm or more.

(Method for Producing Aliphatic Polyester Resin Composition)

A method of the present disclosure for producing an aliphatic polyester resin composition is a method for producing the aliphatic polyester resin composition of the present disclosure, and the method includes kneading an aliphatic polyester resin and calcium carbonate in a compressive fluid.

The aliphatic polyester resin composition of the present disclosure can be obtained by kneading an aliphatic polyester resin and calcium carbonate using a compressive fluid. It is generally known that the compressive fluid plasticizes a resin to thereby decrease a melt viscosity of the resin (see. "Latest application technique of supercritical fluid", NTS). A decrease in the melt viscosity and an improvement in the kneading ability seem to be contradictory. Actually, a pressure may be applied without using the compressive fluid for kneading a general calcium carbonate, and this decreases the free volume of the resin to attempt an increase in interaction between the resins (increase in viscosity). Therefore, plasticizing the resin is not effective (see, "k. Yang. R. Ozisik R. Polymer, 47. 2849 (2006)").

As a result of diligently studying whether a compressive fluid is utilized for kneading the aliphatic polyester resin and the calcium carbonate, the present inventors found that calcium carbonate can be kneaded at a temperature that is equal to or lower than a melting point of the aliphatic polyester resin in the presence of the compressive fluid. Particularly, so far, the aliphatic polyester resin, which is drastically decreased in a melt viscosity at a temperature equal to or higher than the melting point, could be kneaded only in the state of a lower melt viscosity. However, in the present disclosure, calcium carbonate can be kneaded in the state of a high viscosity, which is more suitable.

Figure 2:
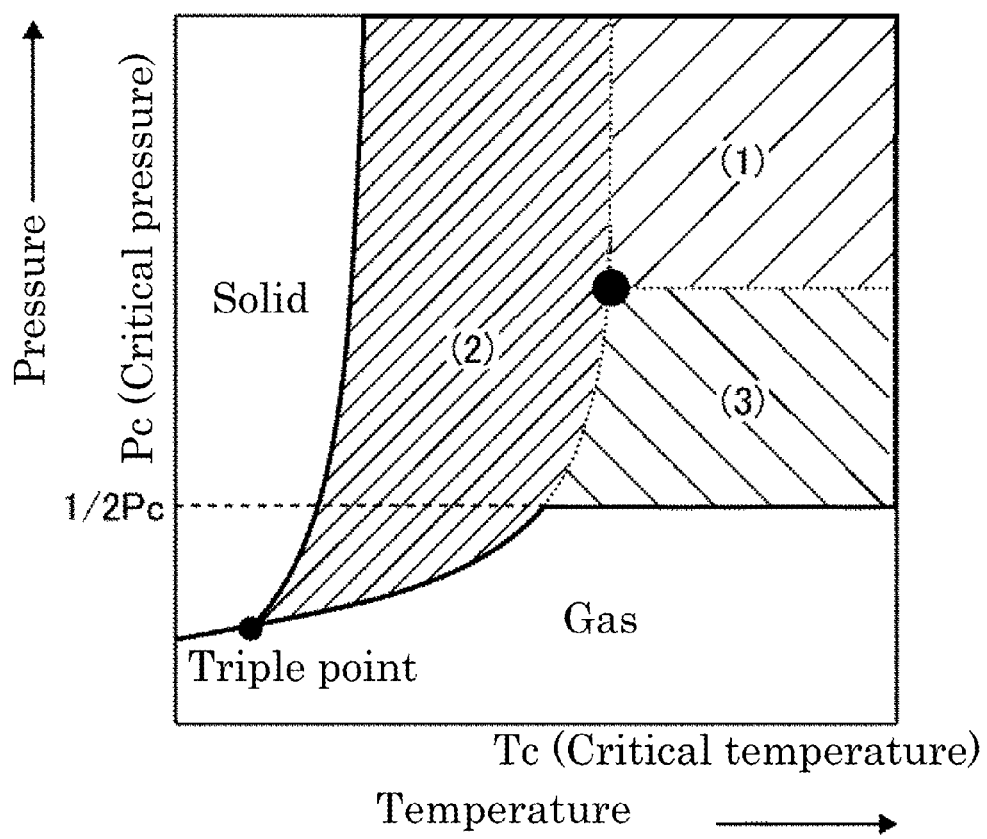
FIG. 2 is a phase diagram which defines a range of a compressive fluid.

Here, FIG. 1 and FIG. 2 are used to present a compressive fluid used for producing an aliphatic polyester resin composition. FIG. 1 is a phase diagram depicting the state of a substance depending on pressure and temperature conditions. FIG. 2 is a phase diagram which defines a range of a compressive fluid. Here, the larger filled circle in FIG. 2 presents a critical point as indicated in FIG. 1. The "compressive fluid" in the present embodiment refers to a state of a substance present in any one of the regions (1), (2) and (3) of FIG. 2 in the phase diagram presented in FIG. 1.

In such regions, the substance is known to have extremely high density and show different behaviors from those shown at normal temperature and normal pressure. Note that, the substance is a supercritical fluid when it is present in the region (1). The supercritical fluid is a fluid that exists as a non-condensable high-density fluid at temperature and pressure exceeding a limiting point (critical point) at which a gas and a liquid can coexist and that does not condense even when it is compressed. When the substance is in the region (2), the substance is a liquid, but it is a liquefied gas obtained by compressing a substance existing as a gas at normal temperature (25° C.) and normal pressure (1 atm). When the substance is in the region (3), the substance is in the state of a gas, and is a high-pressure gas of which pressure is ½ or more of the critical pressure (Pc), i.e. ½ Pc or higher.

Examples of a substance that can be used in the state of the compressive fluid include carbon monoxide, carbon dioxide, dinitrogen monoxide, nitrogen, methane, ethane, propane, 2,3-dimethylbutane, ethylene, and dimethyl ether. Among them, carbon dioxide is preferable because the critical pressure and critical temperature of carbon dioxide are about 7.4 MPa and about 31° C., respectively, and thus a supercritical state of carbon dioxide is easily generated. In addition, carbon dioxide is non-flammable, and therefore it is easily handled. These compressive fluids may be used alone or in combination.

The solubility of the compressive fluid varies depending on combination of a resin and a compressive fluid. For example, when polylactic acid and carbon dioxide are combined, a supply amount of the compressive fluid is preferably 2% by mass or more but 20% by mass or less, more preferably 3% by mass or more but 10% by mass or less. When the supply amount of carbon dioxide is less than 2% by mass, an effect of plasticization is limited. When the supply amount of carbon dioxide is more than 20% by mass, phase separation between carbon dioxide and polylactic acid occurs, and uniform kneading cannot be performed in some cases.

<Kneading Apparatus>

As the kneading apparatus, a continuous process may be employed or a batch process may be employed. However, a reaction process is preferably appropriately selected by considering efficiency of an apparatus, characteristics of a product, and quality.

Because viscosity suitable for kneading can be achieved, a single screw extruder, a twin screw extruder, a kneader, a screw-less basket-shaped stirring vessel, BIVOLAK (available from Sumitomo Heavy Industries, Ltd.), N-SCR (available from Mitsubishi Heavy Industries, Ltd.), and tube-shaped polymerization vessel equipped with spectacle-shaped blade (available from Hitachi, Ltd.), lattice-blade or Kenix-type, or Sulzer-type SMLX-type static mixer can be used as the kneading apparatus. In terms of color tone, examples of the kneading apparatus include a finisher that is a self-cleaning-type polymerization apparatus, N-SCR, and a twin-screw extruder. Among them, a finisher and N-SCR are preferable in terms of production efficiency, color tone of a resin, stability, and heat resistance.

Figure 3:
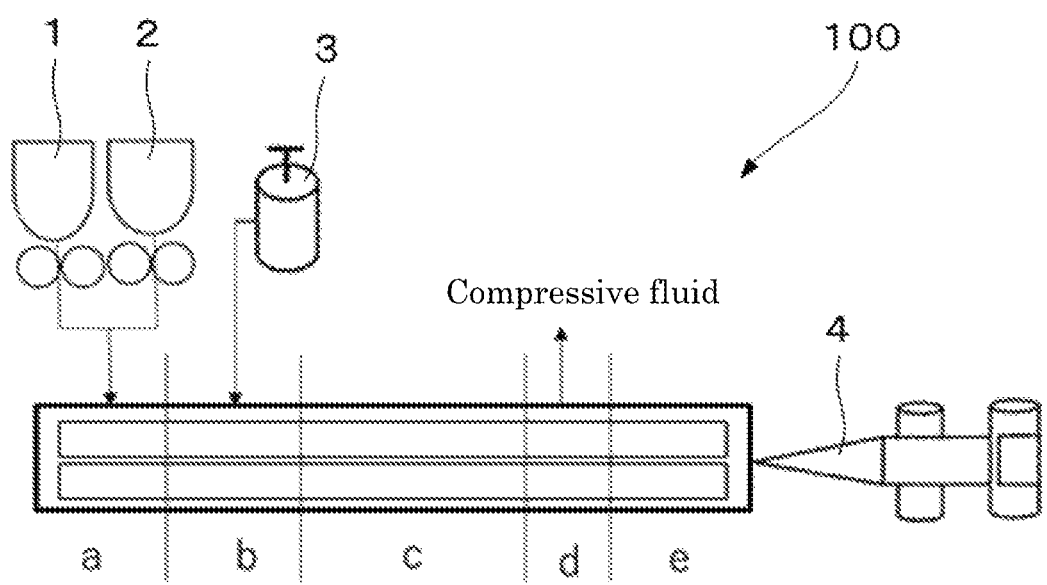
FIG. 3 is a schematic view presenting one example of a continuous kneading apparatus used for producing an aliphatic polyester resin composition of the present disclosure.

As presented in FIG. 3, a continuous kneading apparatus 100 uses a twin screw extruder (available from JSW) (screw caliber: 42 mm, L/D=48), and includes (raw material-mixing melting area a, resin pellet supplying tank 1, calcium carbonate supplying tank 2), (compressive fluid supplying area b, compressive fluid supplying tank 3), kneading area c, compressive fluid removing area d, molding processing area e, and T-die 4. A compressive fluid (liquid material) is supplied by a metering pump. Solid raw materials such as the resin pellet and calcium carbonate are supplied by a quantitative feeder.

<Raw Material Mixing-Melting Area>

In the raw material mixing-melting area, an aliphatic polyester resin pellet and calcium carbonate are mixed, and the temperature is increased. The heating temperature is set to a temperature that is equal to or higher than the resin-melting temperature, which makes it possible to uniformly mix the mixture with a compressive fluid in a subsequent area where the compressive fluid is to be supplied.

<Compressive Fluid Supplying Area>

The aliphatic polyester resin pellet becomes melted through warming, and the compressive fluid is supplied in the state that the calcium carbonate is wetted, to thereby plasticize the melted resin.

<Kneading Area>

The temperature in the kneading area is set so that viscosity suitable for kneading the calcium carbonate is achieved. The setting temperature is not particularly limited because it varies depending on the specification of a reaction apparatus, kinds of resins, the structures of the resin, and the molecular weight thereof. However, in the case of a commercially available polylactic acid having a weight average molecular weight (Mw) of about 200,000, the kneading is generally performed at the melting point of polylactic acid+ (10° C. to 20° C.). Meanwhile, in the present disclosure, the kneading is performed at the melting point of polylactic acid—(20° C. to 80° C.), more preferably at the melting point of polylactic acid—(30° C. to 60° C.). Simply, the temperature may be set by referring to, for example, current values of stirring power of the apparatus. However, it can be said that these setting values are generally unreachable ranges unless a compressive fluid is used.

<Compressive Fluid Removing Area>

After the kneading, the pressure is released to thereby remove the compressive fluid. At that time, the temperature is preferably set to a temperature that is equal to or higher than the melting temperature of the resin through warming.

<Molding Processing Area>

A produced product of the present disclosure can be produced by applying the conventionally known production method used for a thermoplastic resin. In the case of processing into a sheet, a T-die is used.

(Produced Product)

A produced product of the present disclosure includes the aliphatic polyester resin composition of the present disclosure, and further includes other components if necessary.

Examples of the produced product include molded products, sheets, films, particles, fibers, and foamed bodies. Among them, white sheets and white molded products that utilize color tome of calcium carbonate are preferable.

<Molded Product>

The molded product is a product obtained by processing the aliphatic polyester resin composition of the present disclosure using a mold. The concept of the molded product includes not only molded products as one piece but also components including molded products such as a grip of a tray, and products provided with a molded product such as a tray to which a grip is attached.

A processing method using a mold is not particularly limited and the conventionally known processing methods of a thermoplastic resin can be used. Examples thereof include injection molding, vacuum molding, pressure forming, vacuum pressure forming, and press molding.

The molded product can be obtained by melting the aliphatic polyester resin composition of the present disclosure and then subjecting the melted product to injection molding. In addition, the molded product can be obtained by subjecting a sheet formed of the aliphatic polyester resin composition of the present disclosure to press molding using a mold for molding, followed by shaping (imparting a shape).

The processing conditions at the time of the shaping are appropriately determined depending on, for example, kinds of the aliphatic polyester resin composition of the present disclosure and apparatuses. For example, when the sheet formed of the aliphatic polyester resin composition of the present disclosure is subjected to press molding for the shaping using a mold for molding, a temperature of the mold can be 100° C. or more but 150° C. or less. When the shaping is performed through injection molding, processing through injection molding can be performed by injecting, to a mold, the aliphatic polyester resin composition of the present disclosure that has been heated to 150° C. or more but 250° C. or less, and setting a temperature of the mold to about 20° C. or more but about 80° C. or less.

The conventional aliphatic polyester resin composition including calcium carbonate has problems in terms of physical properties of the sheet (e.g., flexibility and strength of the sheet) and brightness because calcium carbonate is insufficiently dispersed.

The molded product that is molded using the aliphatic polyester resin composition of the present disclosure is excellent in physical properties and brightness. Therefore, the molded product can widely be applied to applications to, for example, industrial materials, daily necessaries, agricultural products, foods, pharmaceuticals, sheets of cosmetics, packaging materials, and trays.

The molded product is useful for applications that utilize biodegradablility of the aliphatic polyester resin composition of the present disclosure, particularly for packaging materials used for foods, cosmetics, and medical sheets such as pharmaceuticals. Further improvement in performances can be expected by achievement of a thinned film achieved by improving dispersibility of calcium carbonate.

<Particles>

Examples of a method for forming the aliphatic polyester resin composition of the present disclosure into particles include a method where the aliphatic polyester resin composition of the present disclosure is pulverized through the conventionally known method.

A particle diameter of the particles is not particularly limited and may be appropriately selected depending on the intended purpose. However, the particle diameter thereof is preferably 1 μm or more but 50 μm or less.

When the particles are a toner for electrophotography, a mixture obtained by mixing a colorant and hydrophobic particles in an aliphatic polyester resin composition is prepared. The mixture may include other additives in addition to a binder resin, the colorant, and the hydrophobic particles. Examples of the other additives include a release agent and a charge-controlling agent. A step of mixing an additive may be performed concurrently with polymerization reaction. Alternatively, the additive may be added upon melting and kneading at the post-process after the polymerization reaction or after the polymerization product is extracted.

<Film>

The film is a product, which is obtained by forming the aliphatic polyester resin composition of the present disclosure into a thin film, and has a thickness of less than 250 μm. The film is produced by subjecting the aliphatic polyester resin composition of the present disclosure to stretch forming.

In this case, the stretch forming method is not particularly limited. However, the uniaxial stretch forming method that is applied to stretch forming of commodity plastics, and simultaneous or sequential biaxial stretch forming method (e.g., the tubular method and the tenter method) can be used.

The film is generally formed within the temperature range of from 150° C. through 280° C. The formed film is subjected to uniaxial or biaxial stretch forming through, for example, the roll method, the tenter method, or the tubular method. The stretching temperature is preferably from 30° C. through 110° C., more preferably from 50° C. through 100° C. Generally, the stretching ratios in the longitudinal direction and the horizontal direction are each preferably from 0.6 folds through 10 folds. After the stretching, a heat treatment such as a process of blowing hot air, a process of emitting infrared rays, a process of emitting microwaves, and a process of bringing the resultant into contact with a heat roll may be performed.

Such stretch forming methods make it possible to obtain various stretch films such as stretch sheets, flat yarn, stretch tape, stretch bands, tape with stripes, and split yarn. A thickness of the stretch film is not particularly limited and may be appropriately selected depending on the intended purpose. However, the thickness thereof is preferably 5 μm or more but less than 250 μm.

The formed stretch film may be subjected to a secondary processing for the purpose of imparting surface functions such as a chemical function, an electrical function, a magnetic function, a mechanical function, friction/abrasion/lubrication functions, an optical function, a thermal function, and a biocompatible function. Examples of the secondary function include emboss processing, painting, adhesion, printing, metallization (e.g., plating), machining, and surface treatments (e.g., a charge-preventing treatment, a corona-discharging treatment, a plasma treatment, a photochromism treatment, physical vapor deposition, chemical vapor deposition, and coating).

The stretch film can widely be applied to applications to, for example, daily necessaries, packaging materials, pharmaceuticals, materials of electrical apparatuses, housings of household appliances, and materials of automobiles.

<Sheet>

The sheet is a product, which is obtained by forming the aliphatic polyester resin composition of the present disclosure into a thin film, and has a thickness of 250 μm or more.

The sheet can be produced by applying, to the aliphatic polyester resin composition of the present disclosure, the conventionally known method for producing a sheet that has been used for thermoplastic resins. The method for producing the sheet is not particularly limited and may be appropriately selected depending on the intended purpose. Examples thereof include the T-die method, the inflation method, and the calendaring method.

The process conditions at the time of processing into the sheet are not particularly limited and may be appropriately determined depending on, for example, kinds of the aliphatic polyester resin composition and apparatuses. For example, when polylactic acid is processed through the T-die method, the sheet processing can be performed using an extruder having a T-die mounted at the outlet, by extruding, from the T-die, the aliphatic polyester resin composition that has been heated to preferably 150° C. or more but 250° C. or less.

<Fiber>

The aliphatic polyester resin composition of the present disclosure can be applied to fibers such as monofilament and multifilament. The concept of the fibers includes not only single fibers such as monofilament but also intermediate products constituted with fibers such as woven fabric and nonwoven fabric, and products including woven fabrics or nonwoven fabrics (e.g., masks).

In the case of monofilament, the aliphatic polyester resin composition of the present disclosure is subjected to melt spinning, cooling, and drawing for fibrillization through the conventionally known method, to thereby produce the fibers. Depending on applications, a coating layer may be formed on the monofilament through the conventionally known method, and the coating layer may include, for example, an antibacterial agent and a colorant. In the case of nonwoven fabrics, the aliphatic polyester resin composition of the present disclosure is subjected to melt spinning, cooling, drawing, fiber spreading, deposition, and a heat treatment through the conventionally known method, to thereby produce the nonwoven fabrics.

<Foamed Body>

The foamed body is obtained by allowing the aliphatic polyester resin composition of the present disclosure to foam. The concept of the foamed body includes not only foamed bodies as one piece such as foamed resins but also components including foamed bodies such as heat insulating materials and soundproofing materials, and products including foamed bodies such as construction materials.

One example of a method for producing the foamed body is, for example, a method for obtaining the foamed body by utilizing gasification of a compressive fluid in an aliphatic polyester resin composition generated when the aliphatic polyester resin composition plasticized or dissolved in the compressive fluid is decreased in temperature and pressure. It is believed that when the compressive fluid in the aliphatic polyester resin composition of the present disclosure is released to the atmosphere, the compressive fluid is diffused at a rate of from $10^{-5}$/sec through $10^{-6}$/sec. When the pressure is released, a decrease in temperature may occur because of constant enthalpy, and controlling the cooling rate may be difficult in some cases. Even in this case, when the elasticity of a polymer at the time of releasing the pressure to the atmosphere is large, cells are maintained to thereby form the foamed body.

In the case of obtaining the foamed body, a predetermined amount of the aliphatic polyester resin composition plasticized or dissolved in a compressive fluid is directly injected into a mold for molding, the pressure is reduced, and then the aliphatic polyester resin composition is heated and molded to thereby produce a molded product of the foamed body. Examples of the heating manner include steam, conductive heat, radiant heat, and microwave. In this case, the aliphatic polyester resin composition is heated to about 100° C. through about 140° C. by these heating manners, preferably heated to from 110° C. through 125° C. by steam for foam molding.

In addition, the general method for producing foamed plastic can be applied to the aliphatic polyester resin composition of the present disclosure, to thereby produce the foamed body. In this case, a resin composition obtained by adding a desired additive such as a modifier or a nucleating agent to the aliphatic polyester resin composition of the present disclosure is extruded using the general melt-extruder to thereby obtain strand. Next, a pelletizer is used to obtain pellets or particles from the strand obtained (step of forming particles). The pellets or the particles are charged into an autoclave and are charged into a gas phase or a liquid phase such as water or pure water. Then, any common additive such as a dispersing agent, a fusion preventing agent, or an adhesion preventing agent is used to prepare a dispersion liquid of resin particles. Moreover, the dispersion liquid of resin particles is foamed using a volatile foaming agent to thereby obtain foamed particles (foaming step). The particles are exposed to the atmosphere and the air is permeated into cells of the particles, and moisture attached to the particles is removed if necessary (aging step). Then, the foamed particles are filled into a closed type mold provided with small pores or slits and are heated and foamed. As a result, a produced product in which individual particles are integrally fused can be obtained.

The foamed body obtained can widely be applied to applications to, for example, cushioning materials, heat insulating materials, soundproofing materials, and vibration damping materials.

EXAMPLES

Examples of the present disclosure will be described hereinafter. However, the present disclosure should not be construed as being limited to these Examples.

Example 1

The continuous kneading apparatus 100 presented in FIG. 3 was used to supply an aliphatic polyester resin and calcium carbonate so that the total of the flow rate of the aliphatic polyester resin and the flow rate of calcium carbonate would be 10 kg/hr. The flow rate of polylactic acid (REVODE190, available from HISUN, melting point: 178° C.) as the aliphatic polyester resin was 6 kg/hr, and the flow rate of heavy calcium carbonate (Softon 2200, available from SHIRAISHI CALCIUM KAISHA, LTD., number average particle diameter: 1.0 µm) was 4 kg/hr. As a compressive fluid, 0.5 kg/h of carbon dioxide (corresponds to 10% by mass relative to polylactic acid) was supplied thereto and the resultant was kneaded to thereby obtain an aliphatic polyester resin composition and a sheet.

Temperatures of the respective zones were set as follows: the raw material mixing-melting area a and the compressive fluid supplying area b: 190° C.; the kneading area c: 150° C.; the compressive fluid removing area d: 190° C.; and the molding processing area e: 190° C. Pressures of the respective zones were set as follows: from the compressive fluid supplying area b to the kneading area c: 7.0 MPa; the compressive fluid removing area d: 0.5 MPa; and the T-die 4: 5 MPa. A thickness of the sheet was set to 300 µm.

Example 2

An aliphatic polyester resin composition and a sheet were obtained in the same manner as in Example 1 except that heavy calcium carbonate (Softon 2200, available from SHIRAISHI CALCIUM KAISHA, LTD., number average particle diameter: 1.0 µm) was changed to heavy calcium carbonate (BF200, available from BIHOKU FUNKA KOGYO CO., LTD., number average particle diameter: 5.0 µm).

Example 3

An aliphatic polyester resin composition and a sheet were obtained in the same manner as in Example 1 except that heavy calcium carbonate (Softon 2200, available from SHIRAISHI CALCIUM KAISHA, LTD., number average particle diameter: 1.0 µm) was changed to heavy calcium carbonate (LIGHTON S-4, available from SHIRAISHI CALCIUM KAISHA, LTD., number average particle diameter: 2.2 µm, a surface treatment had been performed).

Calcium carbonate subjected to the surface treatment is calcium carbonate having a surface coated with a fatty acid for the purpose of improving dispersibility and processability, and imparting glossiness to the surface.

Examples 4 and 5, and Comparative Examples 1 to 3

An aliphatic polyester resin composition and a sheet were obtained in the same manner as in Example 1 except that the temperature and the pressure in the kneading step were changed to the temperature and the pressure as presented in Tables 2 and 3. Note that, the compressive fluid was not used in Comparative Example 1.

Comparative Example 4

An aliphatic polyester resin composition and a sheet were obtained in the same manner as in Example 1 except that the temperature and the pressure in the kneading step were changed to the temperature and the pressure as presented in Table 3, and the calcium carbonate was changed to precipitated calcium carbonate ("KARURAITO"-SA, available from SHIRAISHI CALCIUM KAISHA, LTD., number average particle diameter: 1.0 µm). Note that, the compressive fluid was not used in Comparative Example 4.

Example 6

An aliphatic polyester resin composition and a sheet were obtained in the same manner as in Example 1 except that the resin was changed to polybutylene succinate (available from PTT MCC Biochem, melting point: 115° C.).

Example 7

The resin used in Example 1 was changed to polyglycolic acid (PGA) (available from KUREHA CORPORATION, kuredux 100E35, melting point: 220° C.), and polyglycolic acid (PGA) and calcium carbonate were supplied so that the total of the flow rate of polyglycolic acid (PGA) and the flow rate of calcium carbonate would be 10 kg/hr. The flow rate of polyglycolic acid was 6 kg/hr, and the flow rate of heavy calcium carbonate (Softon 2200, available from SHIRAISHI CALCIUM KAISHA, LTD., number average particle diameter: 1.0 µm) was 4 kg/hr. Carbon dioxide as a first compressive fluid and dimethyl ether as a second compressive fluid were supplied so that the flow rate of carbon dioxide would be 0.25 kg/h and the flow rate of dimethyl ether would be 0.25 kg/h. The kneading operation was performed to thereby obtain an aliphatic polyester resin composition and a sheet.

Temperatures of the respective zones were set as follows: the raw material mixing-melting area a and the compressive fluid supplying area b: 230° C.; the kneading area c: 150° C.; the compressive fluid removing area d: 230° C.; and the molding processing area e: 230° C. Pressures of the respective zones were set as follows: from the compressive fluid supplying area b to the kneading area c: 7.0 MPa; the compressive fluid removing area d: 0.5 MPa; and the T-die 7: 5 MPa. A thickness of the sheet was set to 300 µm.

Example 8

An aliphatic polyester resin composition and a sheet were obtained in the same manner as in Example 1 except that heavy calcium carbonate (Softon 2200, available from SHIRAISHI CALCIUM KAISHA, LTD., number average particle diameter: 1.0 μm) was changed to precipitated calcium carbonate (product name: "KARURAITO"-SA, available from SHIRAISHI CALCIUM KAISHA, LTD., number average particle diameter: 0.15 μm).

Characteristics of Examples 1 to 8 and Comparative Examples 1 to 4 were evaluated in the following manner. Results are presented in Table 1 to Table 3.

<Method for Measuring Rate of Aliphatic Polyester Resin>

The following GCMS analysis was performed, and the component could be specified through comparison using a known aliphatic polyester resin as a standard sample.

GCMS Analysis

GCMS: QP2010, available from SHIMADZU CORPORATION; auxiliary device: Py3030D, available from Frontier Laboratories Ltd.
Separation column: Ultra ALLOY UA5-30M-0.25F, available from Frontier Laboratories Ltd.
Sample heating temperature: 300° C.
Column oven temperature: 50° C. (maintained for 1 minute) to temperature rising: 15° C./min to 320° C. (6 minutes)
Ionization method: Electron Ionization (E. I) method
Detection mass range: from 25 to 700 (m/z)

<Number Average Particle Diameter of Calcium Carbonate and Standard Deviation ($\sigma$)>

A cross section of the sheet formed of the aliphatic polyester resin composition was processed using an ion milling apparatus, and the cross section was observed through SEM.

The white component corresponding to calcium carbonate and the resin component in the photograph of the obtained cross section taken through SEM (magnification: 3000 folds) were binarized using a software (Image-Pro Premier, available from Mediacy). Then, a particle diameter (Feret diameter) was determined within the range of 35 μm×20 μm, and a number average particle diameter of the white component (calcium carbonate) having a Feret diameter of 0.05 μm or more and its standard deviation ($\sigma$) were calculated.

<Measurement of Number of Coarse Particles of Calcium Carbonate>

Regarding the number of coarse particles (number/g) of calcium carbonate having a particle diameter of 10 μm or more, the aliphatic polyester resin composition (50 mg) was melted again to form a thin film having a thickness of 10 μm. Then, an optical microscope (available from Nikon, FX-21, magnification: 100 folds) was used to count the number of calcium carbonate having a particle diameter of 10 μm or more.

<Brightness>

Each of the obtained sheets having a thickness of 300 μm was measured for Lab using a spectroscopic color difference meter (Exact, available from X-Rite). The Hunter brightness (W) was calculated by the following formula (1), and the brightness was evaluated based on the following evaluation criteria.

$$W=100-[(100-L)^2+a^2+b^2]^{1/2} \qquad (1)$$

[Evaluation Criteria]
A: The Hunter brightness was 83 or more.
B: The Hunter brightness was 80 or more but less than 83.
C: The Hunter brightness was less than 80.

TABLE 1

|  |  | Example 1 | Example 2 | Example 3 |
|---|---|---|---|---|
| Aliphatic polyester resin | Kind | Polylactic acid | Polylactic acid | Polylactic acid |
| Rate of aliphatic polyester resin relative to total amount of organic matters | | 100% by mass | 100% by mass | 100% by mass |
| Calcium carbonate | Kind | Heavy | Heavy | Heavy |
| | Surface treatment | None | None | Done |
| | Number average particle diameter (μm) | 1.0 | 5.0 | 2.2 |
| Feed ratio (aliphatic polyester resin/calcium carbonate) (% by mass) | | 60/40 | 60/40 | 60/40 |
| Compressive fluid | Kind | Carbon dioxide | Carbon dioxide | Carbon dioxide |
| | Supply amount (relative to aliphatic polyester resin) | 10% by mass | 10% by mass | 10% by mass |
| Kneading step | Temperature (° C.) | 150 | 150 | 150 |
| | Pressure (MPa) | 7 | 7 | 7 |
| Calcium carbonate in aliphatic polyester resin composition | Number average particle diameter (μm) | 0.35 | 0.38 | 0.34 |
| | Standard deviation ($\sigma$) | 0.42 | 0.56 | 0.5 |
| | Number of coarse particles (number/1 g) | 40 | 80 | 60 |
| Evaluation result | Brightness | B | B | B |

TABLE 2

| | | Example 4 | Example 5 | Example 6 | Example 7 | Example 8 |
|---|---|---|---|---|---|---|
| Aliphatic polyester resin | Kind | Polylactic acid | Polylactic acid | Polybutylene succinate | PGA | Polylactic acid |
| Rate of aliphatic polyester resin relative to total amount of organic matters | | 100% by mass | 100% by mass | 100% by mass | 100% by mass | 100% by mass |
| Calcium carbonate | Kind | Heavy | Heavy | Heavy | Heavy | Precipitated |
| | Surface treatment | None | None | None | None | None |
| | Number average particle diameter (μm) | 1.0 | 1.0 | 1.0 | 1.0 | 0.15 |
| Feed ratio (aliphatic polyester resin/calcium carbonate) (% by mass) | | 60/40 | 60/40 | 60/40 | 60/40 | 60/40 |
| Compressive fluid | Kind | Carbon dioxide | Carbon dioxide | Carbon dioxide | Carbon dioxide/ dimethyl ether (1:1) | Carbon dioxide |
| | Supply amount (relative to aliphatic polyester resin) | 10% by mass | 10% by mass | 10% by mass | 10% by mass | 10% by mass |
| Kneading step | Temperature (° C.) | 130 | 110 | 150 | 150 | 150 |
| | Pressure (MPa) | 10 | 10 | 7 | 7 | 7 |
| Calcium carbonate in aliphatic polyester resin composition | Number average particle diameter (μm) | 0.31 | 0.28 | 0.38 | 0.34 | 0.36 |
| | Standard deviation (σ) | 0.41 | 0.36 | 0.57 | 0.48 | 0.38 |
| | Number of coarse particles (number/1 g) | 40 | 20 | 60 | 60 | 160 |
| Evaluation result | Brightness | A | A | B | B | B |

TABLE 3

| | | Comparative Example 1 | Comparative Example 2 | Comparative Example 3 | Comparative Example 4 |
|---|---|---|---|---|---|
| Aliphatic polyester resin | Kind | Polylactic acid | Polylactic acid | Polylactic acid | Polylactic acid |
| Rate of aliphatic polyester resin relative to total amount of organic matters | | 100% by mass | 100% by mass | 100% by mass | 100% by mass |
| Calcium carbonate | Kind | Heavy | Heavy | Heavy | Precipitated |
| | Surface treatment | None | None | None | None |
| | Number average particle diameter (μm) | 1.0 | 1.0 | 1.0 | 1.0 |
| Feed ratio (aliphatic polyester resin/calcium carbonate) (% by mass) | | 60/40 | 60/40 | 60/40 | 60/40 |
| Compressive fluid | Kind | None | Carbon dioxide | Carbon dioxide | Carbon dioxide |
| | Supply amount (relative to aliphatic polyester resin) | — | 10% by mass | 10% by mass | 10% by mass |
| Kneading step | Temperature (° C.) | 190 | 190 | 170 | 190 |
| | Pressure (MPa) | 0.5 | 3 | 4 | 0.5 |

TABLE 3-continued

|  |  | Comparative Example 1 | Comparative Example 2 | Comparative Example 3 | Comparative Example 4 |
|---|---|---|---|---|---|
| Calcium carbonate in aliphatic polyester resin composition | Number average particle diameter (μm) | 1.02 | 0.78 | 0.5 | 0.3 |
|  | Standard deviation (σ) | 1.79 | 0.96 | 0.5 | 0.7 |
|  | Number of coarse particles (number/1 g) | 380 | 180 | 160 | 220 |
| Evaluation result | Brightness | C | C | C | C |

Aspects of the present disclosure are as follows, for example.

<1> An aliphatic polyester resin composition including:
an aliphatic polyester resin; and
calcium carbonate,
wherein an amount of the calcium carbonate in the aliphatic polyester resin composition is 20% by mass or more,
a number average particle diameter of the calcium carbonate in the aliphatic polyester resin composition is 0.20 μm or more but less than 0.40 μm, and
a standard deviation of the number average particle diameter is 0.3 or more but 0.6 or less.
<2> The aliphatic polyester resin composition according to <1>,
wherein a rate of the aliphatic polyester resin is 60% by mass or more relative to a total amount of organic matters in the aliphatic polyester resin composition.
<3> The aliphatic polyester resin composition according to <1> or <2>,
wherein an amount of the calcium carbonate is 20% by mass or more but 60% by mass or less.
<4> The aliphatic polyester resin composition according to any one of <1> to <3>,
wherein the calcium carbonate is heavy calcium carbonate.
<5> The aliphatic polyester resin composition according to any one of <1> to <4>,
wherein the aliphatic polyester resin is at least one selected from the group consisting of polylactic acid, polyglycolic acid, poly(3-hydroxybutyrate), poly(3-hydroxybutyrate-3-hydroxyhexanoate), poly(3-hydroxybutyrate-3-hydroxyvalerate), polycaprolactone, polybutylene succinate, and poly(butylene succinate-adipate).
<6> The aliphatic polyester resin composition according to any one of <1> to <5>,
wherein a rate of number of coarse particles of the calcium carbonate having a particle diameter of 10 μm or more is 100 or less by number relative to 1 g of the aliphatic polyester resin composition.
<7> A method for producing the aliphatic polyester resin composition according to any one of <1> to <6>, the method including
kneading the aliphatic polyester resin and the calcium carbonate in a compressive fluid.
<8> The method for producing the aliphatic polyester resin composition according to <7>,
wherein the kneading is performed at a temperature that is equal to or lower than a melting point of the aliphatic polyester resin.
<9> The method for producing the aliphatic polyester resin composition according to <7> or <8>,
wherein the compressive fluid is carbon dioxide.
<10> A produced product including
the aliphatic polyester resin composition according to any one of <1> to <6>.
<11> The produced product according to <10>,
wherein the produced product is at least one selected from the group consisting of molded products, sheets, films, particles, fibers, and foamed bodies.

The aliphatic polyester resin composition according to any one of <1> to <6>, the method for producing the aliphatic polyester resin composition according to any one of <7> to <9>, and the produced product according to <10> or <11> can solve the existing problems in the art and can achieve the object of the present disclosure.

What is claimed is:
1. An aliphatic polyester resin composition, comprising:
an aliphatic polyester resin; and
calcium carbonate,
wherein an amount of the calcium carbonate in the aliphatic polyester resin composition is 20% by mass or more,
a number average particle diameter of the calcium carbonate in the aliphatic polyester resin composition is 0.20 μm or more but less than 0.40 μm, and
a standard deviation of the number average particle diameter is 0.3 or more but 0.6 or less.
2. The aliphatic polyester resin composition according to claim 1,
wherein a rate of the aliphatic polyester resin is 60% by mass or more relative to a total amount of organic matters in the aliphatic polyester resin composition.
3. The aliphatic polyester resin composition according to claim 1,
wherein an amount of the calcium carbonate is 20% by mass or more but 60% by mass or less.
4. The aliphatic polyester resin composition according to claim 1,
wherein the calcium carbonate is heavy calcium carbonate.
5. The aliphatic polyester resin composition according to claim 1,
wherein the aliphatic polyester resin is at least one selected from the group consisting of polylactic acid, polyglycolic acid, poly(3-hydroxybutyrate), poly(3-hydroxybutyrate-3-hydroxyhexanoate), poly(3-hydroxybutyrate-3-hydroxyvalerate), polycaprolactone, polybutylene succinate, and poly(butylene succinate-adipate).
6. The aliphatic polyester resin composition according to claim 1.
wherein a rate of number of coarse particles of the calcium carbonate having a particle diameter of 10 μm or more is 100 or less by number relative to 1 g of the aliphatic polyester resin composition.

7. A method for producing the aliphatic polyester resin composition according to claim 1, the method comprising:
kneading the aliphatic polyester resin and the calcium carbonate in a compressive fluid.

8. The method for producing the aliphatic polyester resin composition according to claim 7,
wherein the kneading is performed at a temperature that is equal to or lower than a melting point of the aliphatic polyester resin.

9. The method for producing the aliphatic polyester resin composition according to claim 7,
wherein the compressive fluid is carbon dioxide.

10. A produced product, comprising:
the aliphatic polyester resin composition according to claim 1.

11. The produced product according to claim 10,
wherein the produced product is at least one selected from the group consisting of molded products, sheets, films, particles, arid fibers.

12. The produced product according to claim 10, further comprising a foamed body.

13. The aliphatic polyester resin composition according to claim 1, wherein the polyester comprises polylactic acid.

14. The aliphatic polyester resin composition according to claim 1, wherein the polyester comprises polybutylene succinate.

15. The aliphatic polyester resin composition according to claim 1, wherein the polyester comprises polyglycolic acid.

16. The aliphatic polyester resin composition according to claim 1, wherein the standard deviation of the number average particle diameter is 0.3 or more but 0.45 or less.

17. The aliphatic polyester resin composition according to claim 1, wherein a rate of the aliphatic polyester resin is 99% by mass or more relative to a total amount of organic matters in the aliphatic polyester resin composition.

18. The aliphatic polyester resin composition according to claim 1,
wherein a rate of number of coarse particles of the calcium carbonate having a particle diameter of 10 μm or more is 40 or less by number relative to 1 g of the aliphatic polyester resin composition.

19. The aliphatic polyester resin composition according to claim 1, wherein the polyester comprises polyglycolic acid, wherein the standard deviation of the number average particle diameter is 0.3 or more but 0.45 or less, wherein a rate of the polyglycolic acid is 99% by mass or more relative to a total amount of organic matters in the aliphatic polyester resin composition, and wherein a rate of number of coarse particles of the calcium carbonate having a particle diameter of 10 μm or more is 40 or less by number relative to 1 g of the aliphatic polyester resin composition.

* * * * *